Dec. 15, 1970  J. F. VAN FLEET  3,546,977

AUTOMATIC SCREW MACHINE TOOLING

Filed May 24, 1968  2 Sheets-Sheet 1

INVENTOR
JACK F. VAN FLEET

BY *Whittemore, Hulbert & Belknap*

ATTORNEYS

Dec. 15, 1970  J. F. VAN FLEET  3,546,977
AUTOMATIC SCREW MACHINE TOOLING
Filed May 24, 1968  2 Sheets-Sheet 2

INVENTOR
JACK F. VAN FLEET
BY Whittemore, Hulbert & Belknap
ATTORNEYS

United States Patent Office 3,546,977
Patented Dec. 15, 1970

3,546,977
AUTOMATIC SCREW MACHINE TOOLING
Jack F. VanFleet, Holland, Mich., assignor to Universal American Corporation, formerly Robfre Manufacturing Corporation, New York, N.Y., a corporation of Delaware
Filed May 24, 1968, Ser. No. 731,947
Int. Cl. B23b 39/16
U.S. Cl. 77—23     5 Claims

ABSTRACT OF THE DISCLOSURE

Tooling for an automatic screw machine including a head adapted to be rotated in synchronism with a work piece, and a rotary tool carried by the head eccentrically thereof. The tool is driven in rotation as a consequence of rotation of the head. The tool is movable along its axis of rotation, preferably parallel to the axes of rotation of the work piece and tool head, into operating engagement with the work piece.

FIELD OF THE INVENTION

While the present invention may comprise a complete specially designed machine, it also comprises special tooling for an automatic screw machine.

An automatic screw machine is a machine of the type in which elongated work matreial such as bar stock, is advanced in increments and is driven in rotation while it is subjected to the action of different tools at different stations. Inasmuch as the work is driven in rotation, in the past the operations which have been performed on the work piece have usually been operations performed essentially by tools adapted to perform operations such as turning, threading, cut-off, or the like, where the relative movement between the tool and the work piece is the result of the specific rotation imparted to the work piece.

SUMMARY OF THE INVENTION

In accordance with the present invention a tool head is provided which includes a rotary support mounted for rotation about an axis coincident with the axis of rotation of the work piece in synchronism therewith. The rotary support carries one or more work engaging members, normally cutting tools such as drills, which are designed to perform operations at limited areas on the work piece spaced radially from its axis of rotation. Conveniently, the means for effecting specific rotation of the tools may include means deriving the driving action from the rotation of the tool support.

It is accordingly an object of the present invention to provide a machine tool including means for rotating a work piece and a tool support in synchronism about a common axis, the tool support having one or more separate work engaging tools engageable with a circumferentially fixed zone spaced from the axis of the work piece.

It is a further object of the present invention to provide apparatus as described in the preceding paragraph in which the tool comprises a drill, and means are provided for driving the drill in rotation comprising gearing including a ring gear engageable by a pinion fixed to the tool and rotatable as a result of rotation of the tool support.

Other objects and features of the invention will become apparent as the description proceeds, especially when taken in conjunction with the accompanying drawings, illustrating a preferred embodiment of the invention.

DESCRIPTION OF THE PREFERRED EMBODIMENT

Figure 1:
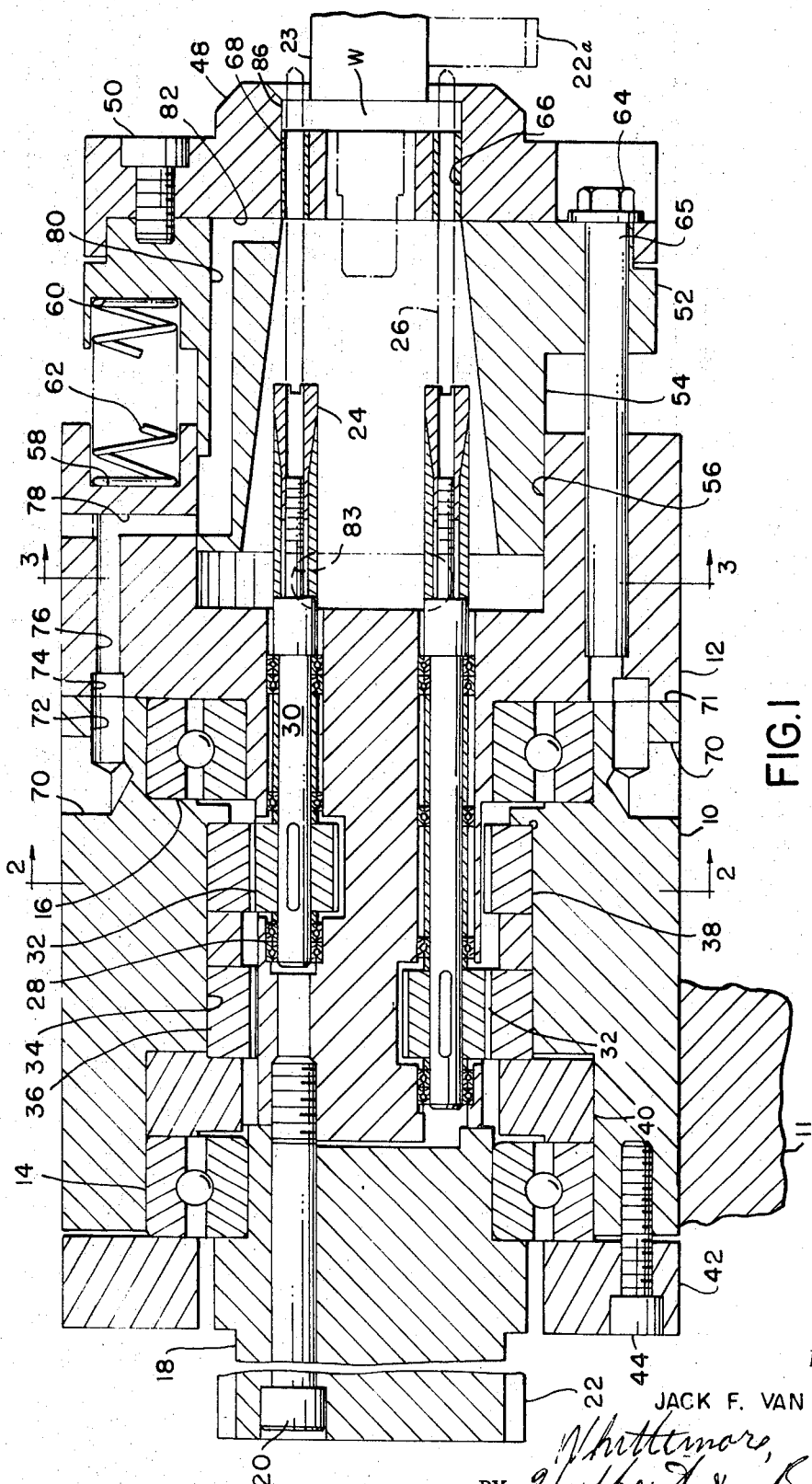
FIG. 1 is a longitudinal sectional view through a tool head constructed in accordance with the present invention.

The tooling comprises a base 10 adapted to be mounted on the frame 11 of a machine tool such for example as a portion of an automatic screw machine. A pinion gear housing 12 is mounted for rotation in the base 10 by bearings indicated at 14 and 16. Means are provided for driving the pinion housing 12 in rotation and this means comprises a block 18 secured by suitable means such for example as screws 20 to the pinion housing 12. The block 18 is diagrammatically illustrated as provided with drive means such as gear teeth 22 which are connected by suitable gearing to a drive shaft of the machine tool which also drives the work support in rotation. Similar drive means including the gear 22a are provided for rotating the work support 23 and conveniently, the drive means for the gears 22 and 22a may comprise a single drive shaft and identical gearing. The arrangement is such that the pinion support 12 and the work support carrying the work piece W are driven for rotation on a common axis in exact synchronism.

Carried by the pinion housing 12 are a plurality of tool supports which in the embodiment of the invention disclosed herein, comprise chucks 24 adapted to support rotary tools such for example as drills indicated in dot and dash lines at 26. Each of the chucks is supported for rotation by bearings 28 supporting the tool drive shafts 30 to which are keyed drive pinions 32.

Fixed within the central bore 34 of the base are ring gears 36 and 38. The pinions 32 which are keyed to the tool drive shafts 30 are in mesh with the ring gears. The ring gears 36 and 38 are clamped in fixed position by a retainer ring 40 and an annular bearing cap 42 which is connected to the base by suitable means such as screws 44.

Figure 2:
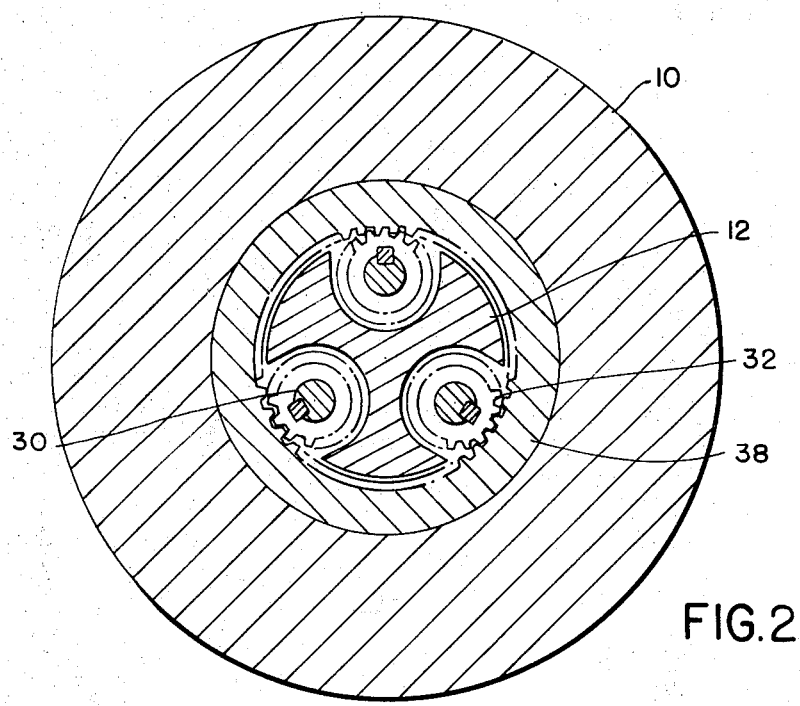
FIG. 2 is a section on the line 2—2, FIG. 1.
Figure 3:
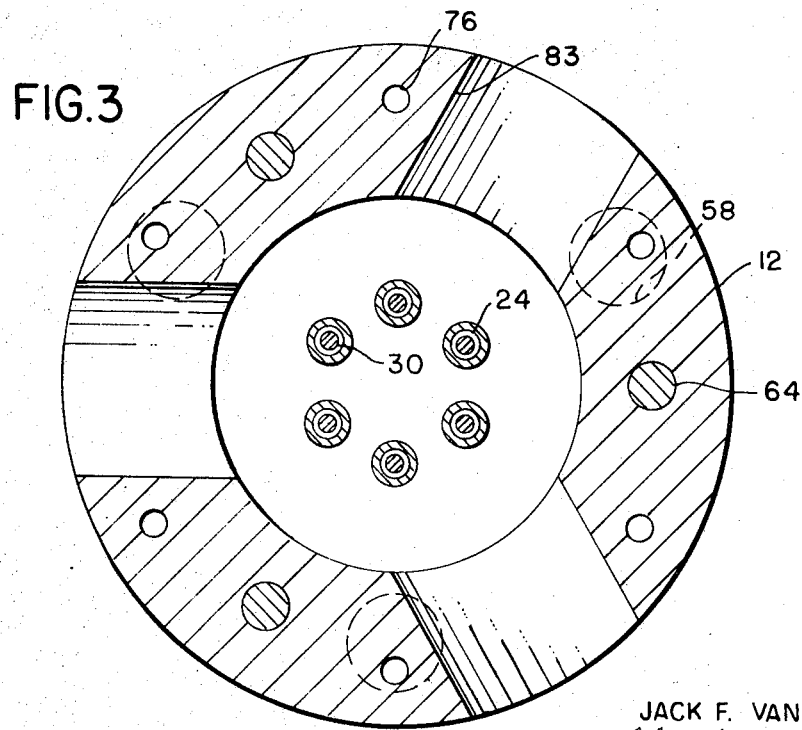
FIG. 3 is a section on the line 3—3, FIG. 1

The reason for employing two ring gears 36 and 38 is apparent from FIG. 2 at which point it will be observed that three pinions 32 carried by the pinion housing 12 when spaced 120 degrees apart, do not leave room in the same plane for the remaining three pinions. Accordingly, three of the pinions mesh with the ring gear 36 and the remaining three, spaced circumferentially from the first set, are in mesh with the ring gear 38.

As a result of the arrangement thus far described it will be apparent that rotation of the pinion housing 12 in synchronism with the workpiece W will cause the individual tool chucks 24 to be driven in rotation as a result of the orbital movement of the pinions around the ring gears.

A bushing housing 48 is provided at the forward end of the pinion housing and is connected as by screws 50 to the annular housing seat 52. The housing seat 52 is reduced as indicated at 54 and the reduced end portion thereof is slidable in a cylindrical recess 56 formed at the forward end of the pinion housing. Confronting spring pockets 58 and 60 are provided in the confronting faces of the pinion housing 12 and the housing seat 52 respectively, and compression springs 62 provided in these seats. urge the housing seat and bushing housing 48 to the right. Movement of the bushing housing 48 and the housing seat 52 to the right is limited by headed stop screws 64 which are threaded into the forward end of dowels 65 connected to the pinion housing.

The drill bushing housing 48 is provided with a number of through openings 66 each of which carries a drill bushing 68 cooperating with one of the drills carried by the associated chuck 24.

Means are provided for supplying coolant to the drills and this means comprises recesses 70 for connection to a supply of cutting oil under pressure. The recesses 70 have associated therewith longitudinally extending passages 72 which communicate through a port slidably confronting surfaces at 71 with an annular channel 74 provided in the rotatable pinion housing 12. The channel 74 connects by passages 76 and 78 in the pinion housing, and the passages 80 and 82 in the housing seat 52, each of the passages 82 being positioned to discharge oil directly on a drill 26 carried by its associated chuck 24. Oil is permitted to escape from the interior of the chamber formed by the cylindrical recess 56 through radially open ports 83.

With the foregoing construction in mind the operation is believed to be readily apparent. The base 10 is mounted on a part of the machine tool, preferably an automatic screw machine, which is movable on the frame 11 toward and away from the rotating workpiece W, which is carried by a work support indicated diagrammatically at 23. Since pinion housing 12 rotates in synchronism with a work support, each drill or other tool revolves in a circular orbit in alignment with the point on the work where a hole is to be drilled. In addition of course, each drill is rotated on its axis by gearing 32, 36, 38. Movement of the base 10 to the right as illustrated in FIG. 1, continues until the drill bushing housing 48 engages the flange 86 of the rotating workpiece. Further movement of the base 10 to the right causes collapse of the springs 62 and causes the end of the drills 26 to move outwardly beyond the drill bushings 68 and to drill openings or holes in the workpiece. In the embodiment of the invention illustrated, the six drills are thus effective to drill six holes through the flange 86 of the workpiece in one operation.

It is of course apparent that instead of providing the base 10 on a part of the machine which is movable toward and away from the rotary work support in a direction parallel to its axis of rotation, the work support itself could be movable axially toward and away from the tools.

It is also apparent that at a different station on the automatic screw machine tools of an entirely different nature might be provided, as for example, non-rotating plungers or gauges adapted to enter the holes drilled in the flange 86 by the drills 26. Further, it will be apparent that by employing suitable gearing for effecting a change in direction, the drills may engage the workpiece other than along paths parallel to the axis. Thus for example, radial holes may be drilled into a workpiece during its continued rotation by a series of radially movable drills carried by a head movable in synchronism with rotation of the workpiece.

The drawing and the foregoing specification constitute a description of the improved automatic screw machine tooling in such full, clear, concise and exact terms as to enable any person skilled in the art to practice the invention, the scope of which is indicated by the appended claims.

What I claim as my invention is:

1. Tooling for an automatic screw machine comprising a frame, a rotary work support on the frame, a tool support on the frame movable toward and away from the work support in a direction parallel to the axis of rotation of the work support, said tooling comprising a ring gear housing having a pair of axially spaced coaxial ring gears whose axes are coincident with the axis of rotation of the work support, a pinion housing rotatable in said ring gear housing, means for driving said pinion housing in synchronism with the rotary work support, pinions rotatably carried by said pinion housing adjacent pinions being in mesh with different ring gears and having their axes of rotation spaced from the axis of rotation of the work support, and rotary tool holders carried by said pinion support and rotatable as a result of orbital movement of said pinions relative to said ring gear about axes parallel to but spaced radially from the axis of rotation of said pinion housing, said pinions being fixed to said tool holders, a drill bushing housing movably carried on said pinion housing, drill bushings in said drill bushing housing in position to receive drills in said tool holders, resilient means urging said drill bushing housing outwardly of said pinion housing toward the work support, said drill bushing housing being engageable with the rotating workpiece revolving at the same speed as the drill bushing housing to arrest its longitudinal movement to provide for advance of drills carried by said tool holders through said bushings to drill holes in a workpiece on the work support.

2. Tooling comprising a gear housing intended to be fixed against rotation in use, a pair of axially spaced coaxial ring gears in said gear housing, a pinion housing connected to said gear housing for rotation with respect thereto about the axis of said ring gears, a plurality of rotary tool holders carried by said pinion housing having their axes of rotation parallel to, spaced radially from and spaced circumferentially around the axis of said ring gears, adjacent ones of said pinion being in mesh with different ones of said pair of ring gears and alternate pinions being in mesh with the same one of said pair of ring gears.

3. Tooling as defined in claim 2 comprising a drill bushing housing connected to said pinion housing for rotation therewith and for movement axially thereof, said bushing housing having drill bushings in alignment with each of said tool holders, resilient means acting between said pinion housing and said drill bushing housing urging said last named housings apart but yieldable to provide for approach between said last named housings to provide for movement of drills carried by said tool holders through said bushings.

4. Tooling as defined in claim 3 in which said gear housing and said pinion housing have surfaces in continuous slidable contact on rotation of said pinion housing, an oil passage in said gear housing for connection to an external source of oil under pressure and extending to a port at the said surface of said gear housing, a circular oil channel in the said surface of said pinion housing which is at all times in communication with said port, and separate passages extending through said pinion and drill bushing and housings and having discharge outlets directly adjacent the inner end of said drill bushings.

5. Tooling as defined in claim 2 in which said gear housing and said pinion housing have surfaces in continuous slidable contact on rotation of said pinion housing, an oil passage in said gear housing for connection to an external source of oil under pressure and extending to a port at the said surface of said gear housing, a circular oil channel in the said surface of said pinion housing which is at all times in communication with said port, and separate passages extending from said channel to a position in advance of each of said tool holders to discharge oil directly on a tool carried by each of said holders.

References Cited
UNITED STATES PATENTS

| | | | |
|---|---|---|---|
| 1,289,564 | 12/1918 | Smith | 77—22 |
| 1,958,844 | 5/1934 | Bullard | 77—23X |

FRANCIS S. HUSAR, Primary Examiner

U.S. Cl. X.R.

10—132